US010471909B2

(12) United States Patent
Abe et al.

(10) Patent No.: US 10,471,909 B2
(45) Date of Patent: Nov. 12, 2019

(54) CLIP AND MOUNTING STRUCTURE OF DOOR TRIM

(71) Applicant: NIFCO INC., Yokosuka-shi, Kanagawa (JP)

(72) Inventors: Ryota Abe, Yokosuka (JP); Shinji Ishii, Hiroshima (JP); Hiroyuki Kihara, Hiroshima (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 25 days.

(21) Appl. No.: 15/866,867

(22) Filed: Jan. 10, 2018

(65) Prior Publication Data
US 2018/0194301 A1    Jul. 12, 2018

(30) Foreign Application Priority Data

Jan. 10, 2017   (JP) .................................. 2017-001571

(51) Int. Cl.
*B60R 13/02*        (2006.01)
*B60J 10/36*        (2016.01)
*B60R 13/08*        (2006.01)

(52) U.S. Cl.
CPC ........... *B60R 13/0206* (2013.01); *B60J 10/36* (2016.02); *B60R 2013/0807* (2013.01)

(58) Field of Classification Search
CPC ............ B60R 13/0206; B60R 13/0243; B60R 2013/0807; F16B 5/065; F16B 5/0657; F16B 21/086; Y10T 24/309; Y10T 24/30; Y10T 24/44026
See application file for complete search history.

(56) References Cited

U.S. PATENT DOCUMENTS

| D541,644 | S | * | 5/2007 | Aoki | ............................. D8/383 |
| 7,669,807 | B2 | * | 3/2010 | Stigler | .................... B60R 11/00 |
| | | | | | 248/229.16 |
| 7,757,997 | B2 | * | 7/2010 | Smutny | ............... B60R 16/0215 |
| | | | | | 24/16 R |
| 8,753,055 | B2 | * | 6/2014 | Ruckel | ................ F16B 37/0842 |
| | | | | | 411/182 |
| 2006/0239772 | A1 | * | 10/2006 | Kuroda | ................... F16B 5/065 |
| | | | | | 403/329 |
| 2012/0317757 | A1 | * | 12/2012 | Risdale | ............... B29C 45/1635 |
| | | | | | 24/458 |
| 2013/0168515 | A1 | * | 7/2013 | Yamamoto | .......... B60R 13/0206 |
| | | | | | 248/231.81 |

(Continued)

FOREIGN PATENT DOCUMENTS

JP         S59-106710 A        6/1984

*Primary Examiner* — Robert Sandy
*Assistant Examiner* — Rowland Do
(74) *Attorney, Agent, or Firm* — Manabu Kanesaka (57) ABSTRACT

A clip for mounting a first member on a second member includes a first placement portion adapted to be placed in the first member; a second placement portion adapted to be placed in the second member; and a flange portion provided between the first placement portion and the second placement portion. The second placement portion includes side walls on two sides, each having an elastic engagement piece formed by a notch, and a shielding wall provided between the side walls and shielding a space between the side walls from an upper side. An engagement end portion of each of the elastic engagement pieces extends to a first placement portion side.

6 Claims, 6 Drawing Sheets

(56) References Cited

U.S. PATENT DOCUMENTS

| | | | | |
|---|---|---|---|---|
| 2015/0191131 A1* | 7/2015 | Yamamoto | ................ | F16B 2/20 |
| | | | | 24/289 |
| 2015/0211555 A1* | 7/2015 | Yamamoto | .......... | B60R 13/0206 |
| | | | | 24/289 |
| 2015/0298623 A1* | 10/2015 | Kato | .................. | B60R 13/0206 |
| | | | | 24/458 |
| 2015/0337882 A1* | 11/2015 | Iwahara | ................ | F16B 5/0657 |
| | | | | 24/489 |
| 2016/0288733 A1* | 10/2016 | Akazawa | .............. | F16B 5/0657 |
| 2016/0375852 A1* | 12/2016 | Yamamoto | ............ | B60R 21/216 |
| | | | | 24/297 |
| 2017/0002853 A1* | 1/2017 | Huet | .................. | B60R 13/0206 |

\* cited by examiner

CLIP AND MOUNTING STRUCTURE OF DOOR TRIM

BACKGROUND OF THE INVENTION AND RELATED ART STATEMENT

The present invention relates to a clip for mounting a first member on a second member. Also, the present invention relates to a mounting structure of a door trim using a clip for a door trim for mounting the door trim on a door panel of a vehicle.

In a vehicle of an automobile and the like, there is adopted a mounting structure for mounting the door trim relative to the door panel using a plurality of clips for the door trim. For example, in Patent Document 1 (Japanese Patent Application Publication No. S59-106710), there is disclosed a trim holding tool (clip) for mounting a trim relative to an inner panel of a vehicle body panel.

Patent Document 1: Japanese Patent Application Publication No. S59-106710

Incidentally, in such a conventional clip for the door trim, in order to allow the door trim to be easily removed from the door panel at a maintenance time, usually, one portion of the clip naturally is bent at an attaching and detaching time of the door trim so as to be capable of removing the door trim. However, while such a clip can be easily removed, since a fixing force by the clip is not strong, for example, in a case wherein another vehicle collides relative to a vehicle from a side face, and the like, there is a possibility that the door trim completely falls out of the door panel, and pops out to a vehicle inner side (passenger side).

In order to prevent such complete falling of the door trim, it can be considered that an operation type (arm-type) locking portion is provided in at least one of the plurality of clips so as to enhance the fixing force by the clip while ensuring easiness of an attachment and detachment of the door trim. However, in a case wherein such an operation type locking portion is provided, there occurs a problem that rainwater can easily enter into a door trim side (vehicle inner side) from a door panel side (vehicle outer side) through a periphery of the locking portion.

Thus, in the conventional clip for the door trim, it is difficult that both reinforcement of the fixing force and prevention of an entry of rainwater coexist while ensuring the easiness of the attachment and the detachment. For example, in the trim holding tool of the aforementioned Patent Document 1, a guide groove for rainwater is provided in one portion of the clip so as to reduce the entry of rainwater, however, since the locking portion is not an operation type, the attachment and detachment are not easy, and the fixing force is not sufficient as well.

The present invention is made in view of the aforementioned circumstances, and an object of the present invention is to improve the fixing force by the clip while ensuring easiness of a removal of the first member (door trim), and to adequately prevent the entry of a liquid (rainwater) into a first member side (vehicle inner side) in a clip for mounting the first member on the second member, or a mounting structure of the door trim using the clip for the door trim.

Further objects and advantages of the invention will be apparent from the following description of the invention.

SUMMARY OF THE INVENTION

In order to obtain the aforementioned object, the present invention adopts the following solution. Namely, according to a first aspect, a clip for mounting a first member on a second member comprises a first placement portion placed in the first member; a second placement portion placed in the second member; and a flange portion provided between the first placement portion and the second placement portion. The second placement portion includes side walls on both sides wherein an elastic engagement piece is formed by a notch; and a shielding wall provided between the side walls on both sides and shielding a space between the side walls on both sides from an upper side. An engagement end portion of the elastic engagement piece extends to the first placement portion side.

According to the aforementioned solution, the clip can firmly fix the first member (for example, a door trim) and the second member (for example, a door panel) by the elastic engagement pieces, and the first member can be easily removed from the second member by an operation of the elastic engagement piece as well. Also, an entry of a liquid (for example, rainwater) from a second member side (for example, a vehicle outer side where the door panel is provided) is adequately prevented by the shielding wall, and the liquid can be prevented from entering into a first member side (for example, a vehicle inner side where the door trim is provided).

Preferred aspects assuming the aforementioned solution are as described in second to fourth aspects. Namely, the shielding wall includes a flat face portion provided on the flange portion side; and an inclining portion provided on a side opposite to the flange portion, and the inclining portion inclines downwardly as moving to the side opposite to the flange portion (corresponding to the second aspect). In that case, the liquid such as the rainwater and the like falling onto the shielding wall flows without retaining toward the inclining portion from the flat face portion, and is guided away from the first member side so as to adequately prevent the entry of the liquid into the first member side.

An engagement-piece introduction portion communicating with the first placement portion side is provided in the flange portion, and an engagement end portion of the elastic engagement piece enters into the engagement-piece introduction portion (corresponding to the third aspect). In that case, the engagement end portion of the elastic engagement piece can be operated from the first member side (for example, the vehicle inner side) so as to easily carry out an engagement release.

An end portion on a side opposite to the flange portion of the second placement portion is closed (corresponding to the fourth aspect). In that case, the liquid does not enter into an inner side (a space surrounded by the both-side side walls and the shielding wall) of the second placement portion from a tip side so as to be difficult for the liquid to enter into the first member side.

Also, according to a fifth aspect, a mounting structure of the door trim for mounting the door trim relative to the door panel comprises a clip for the door trim inserted and fixed in an approximately horizontal direction relative to the door panel from a vehicle interior inner side for fixing the door trim. A portion to be fixed and inserted to the door panel in the clip for the door trim includes side walls on both sides and a shielding wall provided between the side walls on both sides. Each of the side walls on both sides includes an elastic engagement piece having an engagement end portion extending toward the vehicle interior inner side, and the shielding wall is disposed above the elastic engagement piece, and shields the portion inserted to the door panel of the clip for the door trim from an upper side.

According to the aforementioned solution, the door trim is firmly fixed relative to the door panel by the clip for the door trim including the elastic engagement piece, and can be easily removed from the door panel by the operation of the elastic engagement piece from the vehicle interior side, and an entry of rainwater from the vehicle outer side (door panel side) is adequately prevented by the shielding wall so as to prevent the rainwater from entering to the vehicle interior inner side (door trim side).

Also, a preferred aspect taking the aforementioned solution is as described in the fifth aspect. Namely, a portion to be mounted on the door trim in the clip for the door trim has an L shape in cross section formed by a horizontal arm portion extending in a horizontal direction and a vertical arm portion extending in a vertical direction from the horizontal arm portion, and the horizontal arm portion is positioned on a lower end side of the vertical arm portion (corresponding to the fifth aspect). In that case, the horizontal arm portion is disposed on a lower side of the clip for the door trim so as to adequately receive a load of the door trim, and an up-and-down direction of the clip can be reliably disposed in a proper position wherein the shielding wall is disposed on an upper side.

According to the present invention, the liquid (rainwater) falling onto the clip (for the door trim) from the second member side (vehicle outer side (door panel side)) is shielded by the shielding wall, and is guided in a direction of separating from the first member side (vehicle inner side (door trim side)) by the inclining portion of the shielding wall so as to adequately prevent the entry of the liquid (rainwater) into the first member side (vehicle inner side) even if the elastic engagement piece operable from the first member side (vehicle inner side) is provided below the shielding wall.

DETAILED DESCRIPTION OF PREFERRED EMBODIMENTS

Hereinafter, an embodiment according to the present invention will be explained based on the attached drawings.

Figure 1:
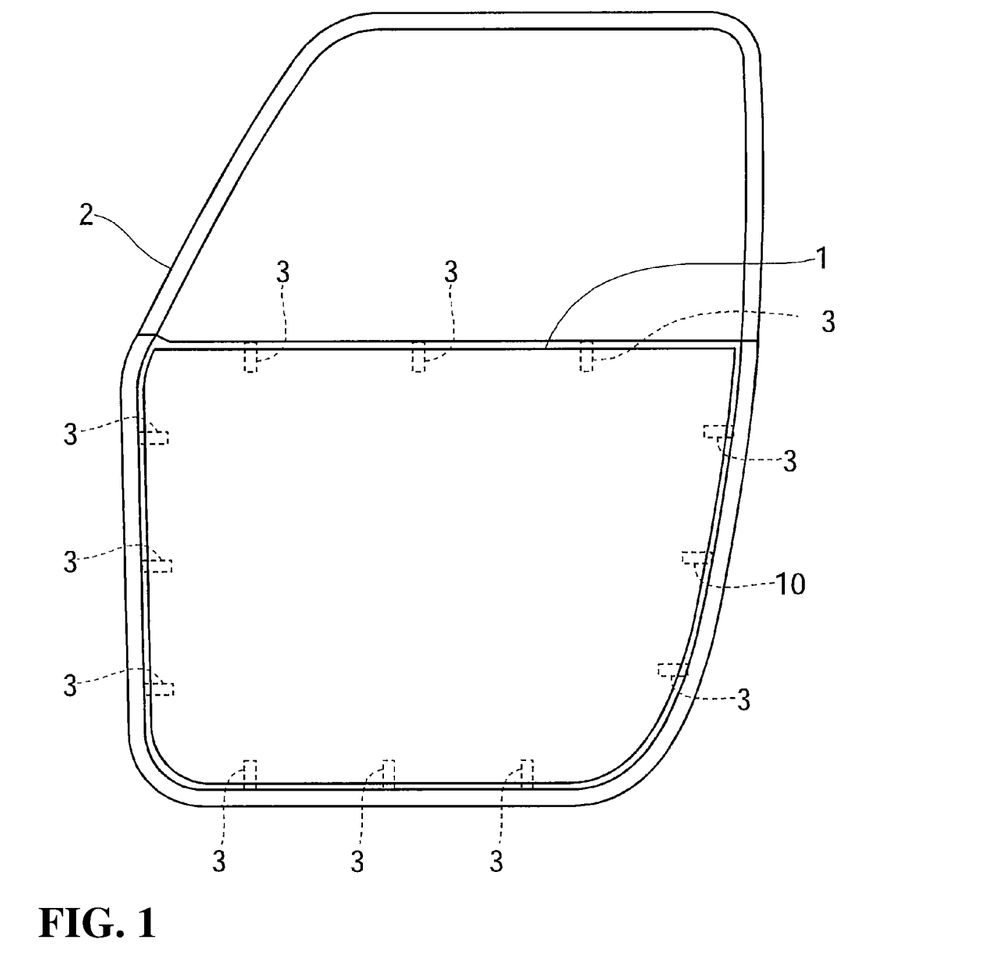
FIG. 1 is a schematic drawing showing a mounting structure of a door trim in an embodiment according to the present invention.
Figure 2:
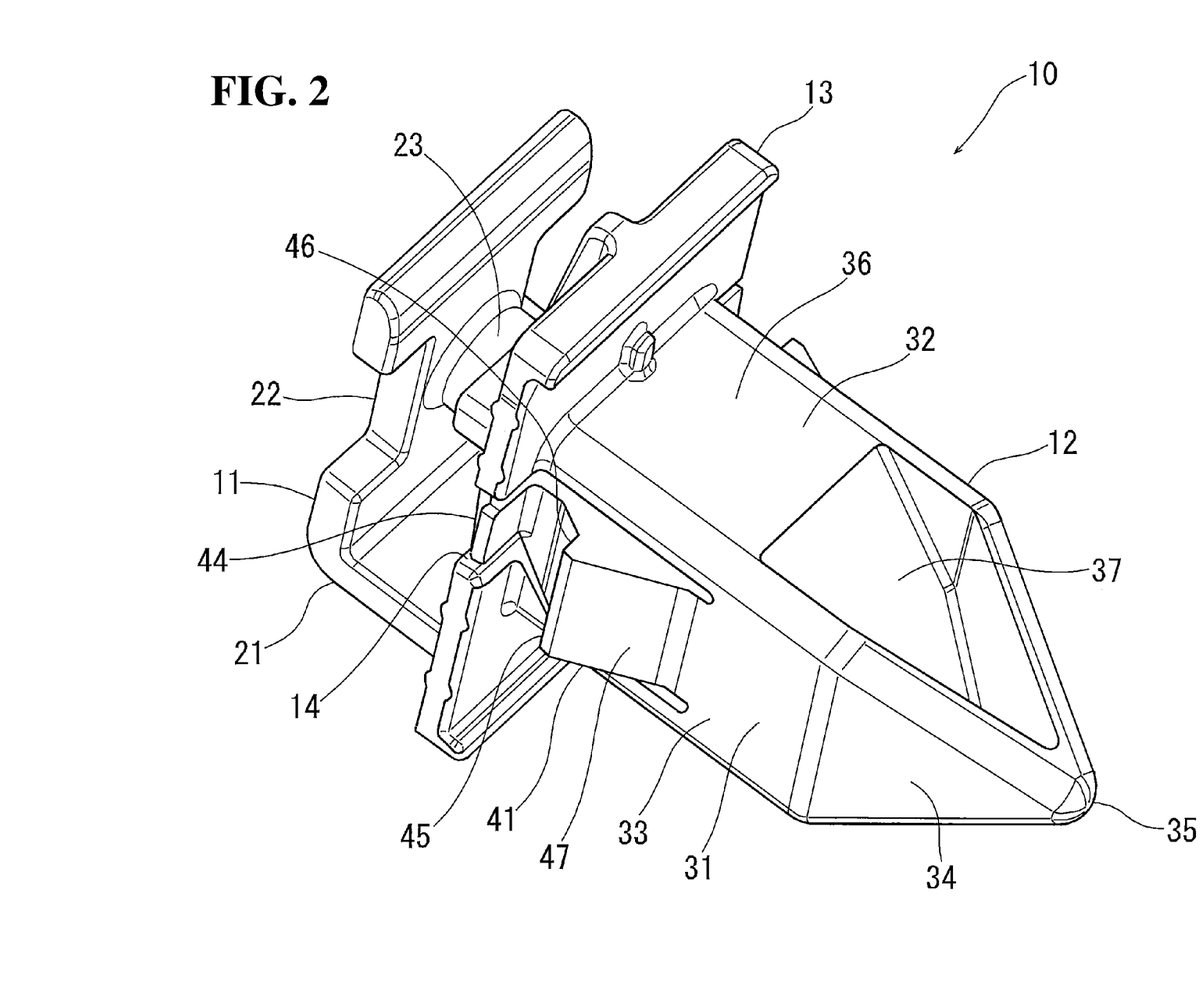
FIG. 2 is a perspective view showing a clip for the door trim in the embodiment according to the present invention.
Figure 3:
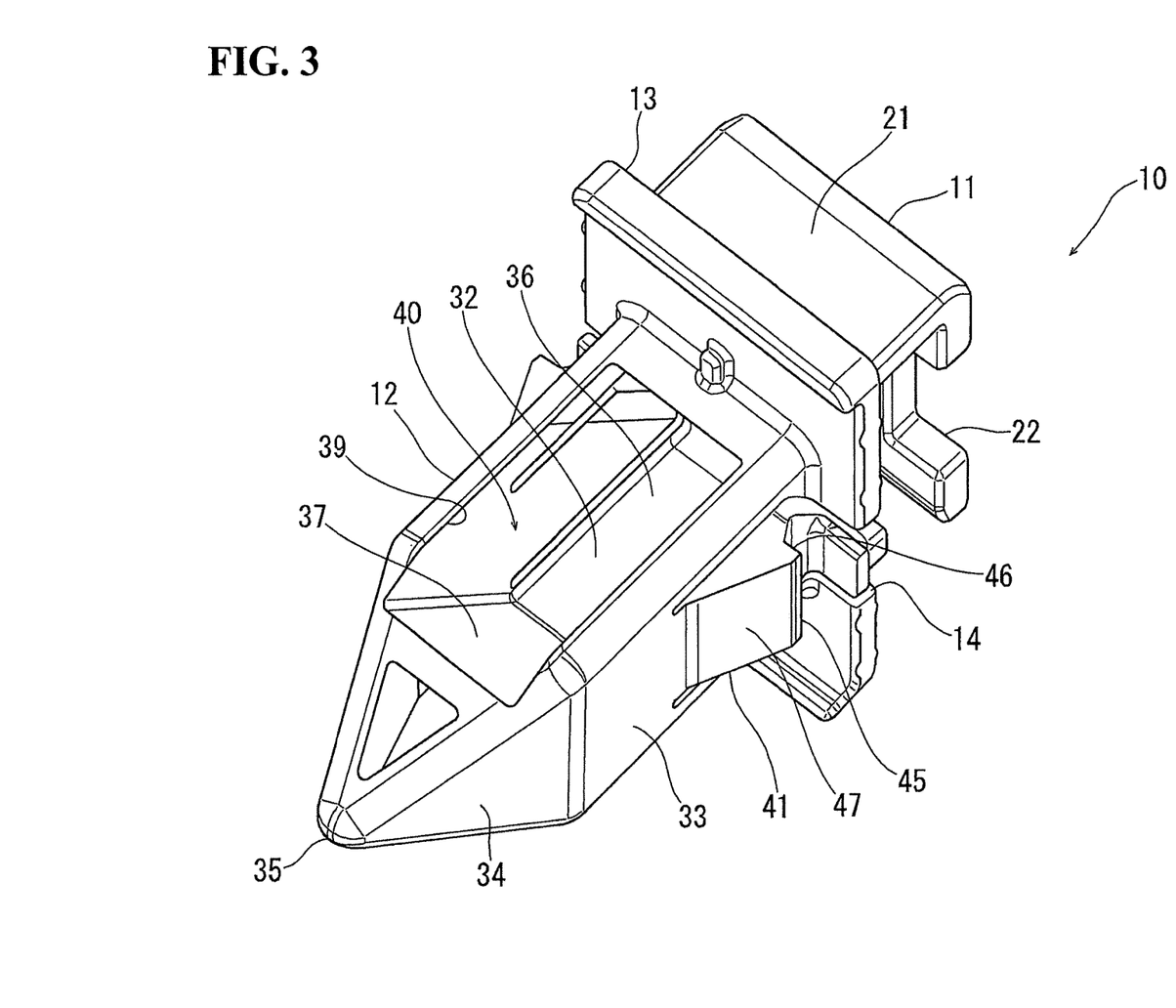
FIG. 3 is a perspective view showing the clip for the door trim.
Figure 4:
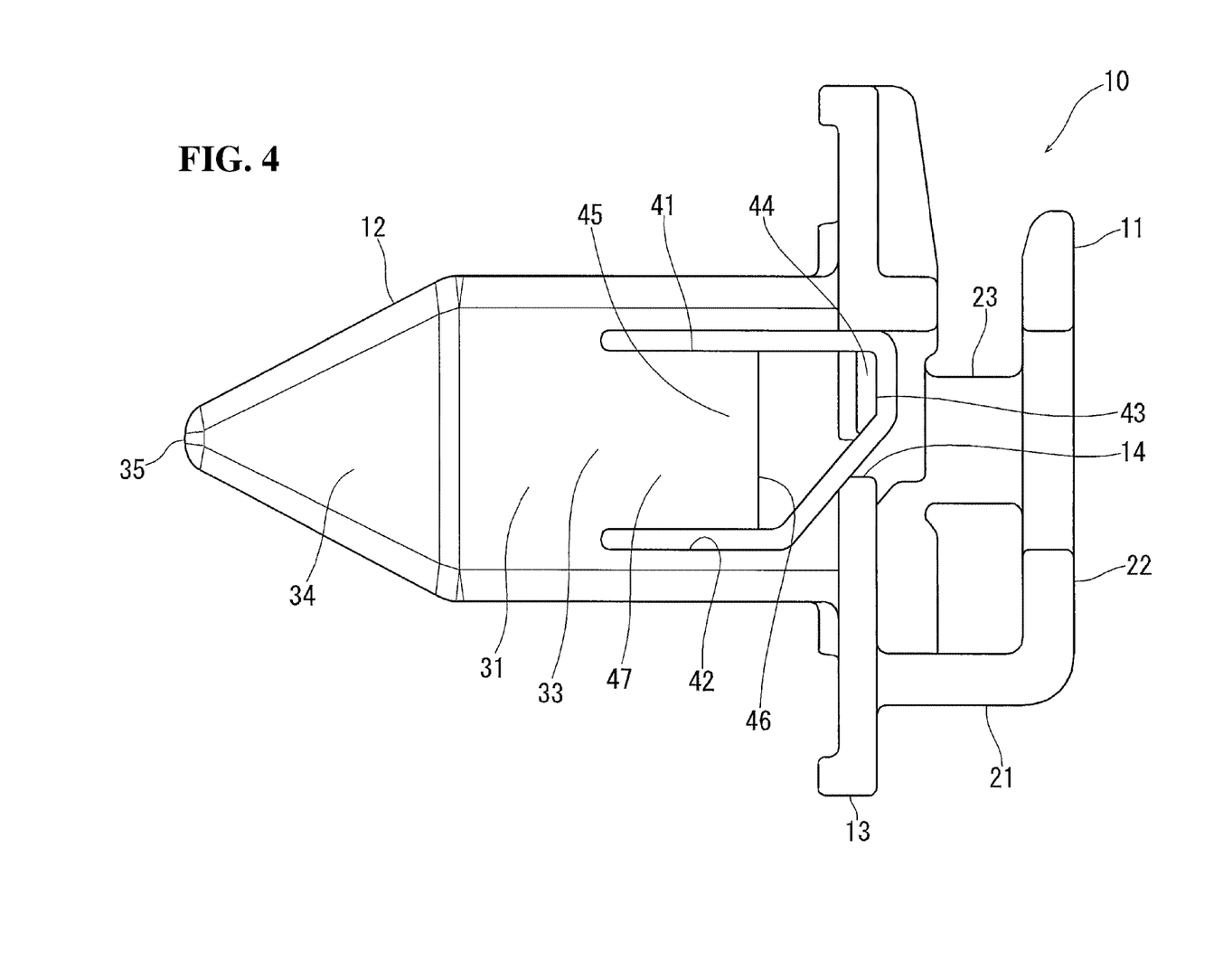
FIG. 4 is a side view showing the clip for the door trim.

FIG. 1 shows a schematic drawing of a mounting structure of a door trim in the present embodiment. As shown in the drawing, a door trim 1 is disposed on an inner side face 2A of a door panel 2, and is fixed to the door panel 2 through a plurality of clips 3 and 10 for the door trim. Among the aforementioned plurality of clips, the clip 10 for the door trim of the present invention is adopted at least for one clip. In the present embodiment, the clip disposed in a vicinity of a center of one side portion of the door trim 1 is the clip 10 of the present invention. Incidentally, as for the other clips 3, conventional clips for the door trim are used.

FIG. 2 to FIG. 5 show the clip 10 for the door trim. Also, FIG. 6 shows a state wherein the clip 10 for the door trim is attached to the door trim 1 and the door panel 2. The clip 10 is a component, for example, integrally molded by resin, and as shown in the drawings, comprises a door-trim placement portion 11 to be placed in the door trim 1; a door-panel placement portion 12 disposed on a door panel 2 side; and a flange portion 13 disposed between the door-trim placement portion 11 and the door-panel placement portion 12.

The door-trim placement portion 11 is a portion with an L shape in cross section formed by a horizontal arm portion 21 extending in a horizontal direction from a vicinity of a lower end of the flange portion 13; and a vertical arm portion 22 extending in a vertical direction upwardly from the horizontal arm portion 21. Incidentally, a connection portion 23 for reinforcement bridges between the flange portion 13 and the vertical arm portion 22. By such a structure, the door-panel placement portion 11 is placed and fixed to a mounting portion of the door trim 1 in such a way so as to clamp a mounting portion 1A (see FIG. 6) of the door trim 1 between the vertical arm portion 22 and the flange portion 13. In that case, the horizontal arm portion 22 is disposed on a lower side of the clip 10 so as to adequately receive a load of the door trim 1, and an up-and-down direction of the clip 10 can be reliably placed in a proper position (the later-described shielding wall 32 can be located on an upper side of the clip 10).

The door-panel placement portion 12 is a portion extending to a side opposite to the door-trim placement portion 11 from the flange portion 13, and the door-panel placement portion 12 is inserted into a mounting hole 2A of the door panel 2, so that the clip 10 is mounted on the door panel 2 (see FIG. 6). As shown in the drawing, the door-panel placement portion 12 is provided with side walls 31 on both sides, and the shielding wall (upper wall) 32 disposed between the side walls 31 on both sides in such a way so as to be positioned in a vicinity of an upper end of the side walls 31. The side walls 31 on both sides are provided with vertical faces 33 on a base end side (flange portion 13 side) vertically extending from the flange portion 13; and inclined faces 34 continuing to a tip side from the vertical faces 33 and inclining in such a way so as to narrow an interval with each other.

Each inclined face 34 has a tapered shape wherein an upper side and a lower side narrow down the interval toward a tip. Thereby, at the tip of the inclined faces 34 on both sides, there is formed a tip top portion 35. Incidentally, the tip top portion 35 becomes an insertion end portion inserted into the mounting hole (not shown in the drawing) of the door panel 2 when the clip 10 is placed in the door panel 2.

The shielding wall 32 of the door-panel placement portion 12 is provided with a horizontal portion 36 on the base end side (flange portion 13 side) vertically extending from the flange portion 13; and an inclining portion 37 continuing to the tip side from the horizontal portion 36 and inclining downwardly as moving to the tip side (tip top portion 35 side). The inclining portion 37 terminates just before the tip top portion 35, and an opening portion 38 opening in the up-and-down direction is formed between the inclining portion 37 and the inclined faces 34 on both sides. Incidentally, when using the clip 10, the clip 10 is used in a position wherein the shielding wall 32 is disposed on the upper side.

A lower side (lower end side of the side walls 31 on both sides) of the door-panel placement portion 12 becomes an opening 39 wherein a wall portion is not provided, and inside the opening 39, there is formed a space 40 surrounded by the shielding wall 32 and the side walls 31 on both sides. Thereby, the space 40 is shielded from above the clip 10 by the shielding wall 32. Also, on the tip side of the door-panel placement portion 12, the space 40 comes to a state of being closed by the tip top portion 35. Incidentally, the opening 39 is formed on the lower side of the door-panel placement portion 12, so that the clip 10 including the later-described elastic engagement pieces 41 can be adequately formed by a resin mold using the opening 39 as a hole for a punching die.

On the vertical face 33 of each side wall 31, there is provided the elastic engagement piece 41. The elastic engagement piece 41 is formed by providing a notch 42 at one portion of the vertical face 33, and can bend toward the inside of the space 40.

An end portion on the flange portion 13 side of each elastic engagement piece 41 becomes an engagement end portion 43 which is a free end, and each engagement end portion 43 enters into a notch portion 14 which is an engagement-piece introduction portion formed in side portions on both sides of the flange portion 13, and is disposed on a side of the flange portion 13. In each engagement end portion 43, there is formed a locking claw 44 bending outwardly.

Also, on an outward face of each elastic engagement piece 41, there is formed a locking portion 45. The locking portion 45 is provided with a vertical step portion 46 facing the locking claw 44, and a slope portion 47 on a side opposite to the vertical step portion 46. The slope portion 47 forms a slope face facing the tip side (tip top portion 35 side).

Incidentally, when the clip 10 is used, on a surface at a door-panel placement portion 12 side of the flange portion 13, there is disposed a seal member 4 disposed in such a way so as to surround the door-panel placement portion 12 so as to provide water-tightness (see FIG. 6).

According to such a structure, an edge portion of the mounting hole 2A of the door panel 2 is clamped between the locking portion 45 (vertical step portion 46) with the locking claw 43 and the flange portion 13 together with the seal member 4, so that the clip 10 is mounted relative to the mounting hole 2A of the door panel 2. Therefore, the clip 10 is firmly fixed to the door panel 2 through the elastic engagement piece 41, so that in a case wherein another vehicle collides relative to the door panel 2 and the like, the door trim 1 comes to a state of being connected to the door panel 2 through the clip 10 so as to prevent the door trim 1 from completely falling off from the door panel 2.

On the other hand, when the clip 10 is removed from the door panel 2, the elastic engagement piece 41 is operated from a vehicle interior inner side (door trim 1 side) to bend toward the inner side (space 40 side) so as to release an engagement between the elastic engagement piece 41 and a mounting portion (edge portion of the mounting hole 2A) of the door panel 2. Therefore, at a maintenance time, the door trim 1 can be easily removed from the door panel 2 completely.

Thus, according to the clip 10, the door trim 1 can be firmly mounted on the door panel 2, and a removing operation of the door trim 1 from the door panel 2 can be easily carried out without problems, and simultaneously, an entry of rainwater into a vehicle inner side (door trim 1 side) from a vehicle outer side (door panel 2 side) can be adequately prevented as well.

Figure 5:
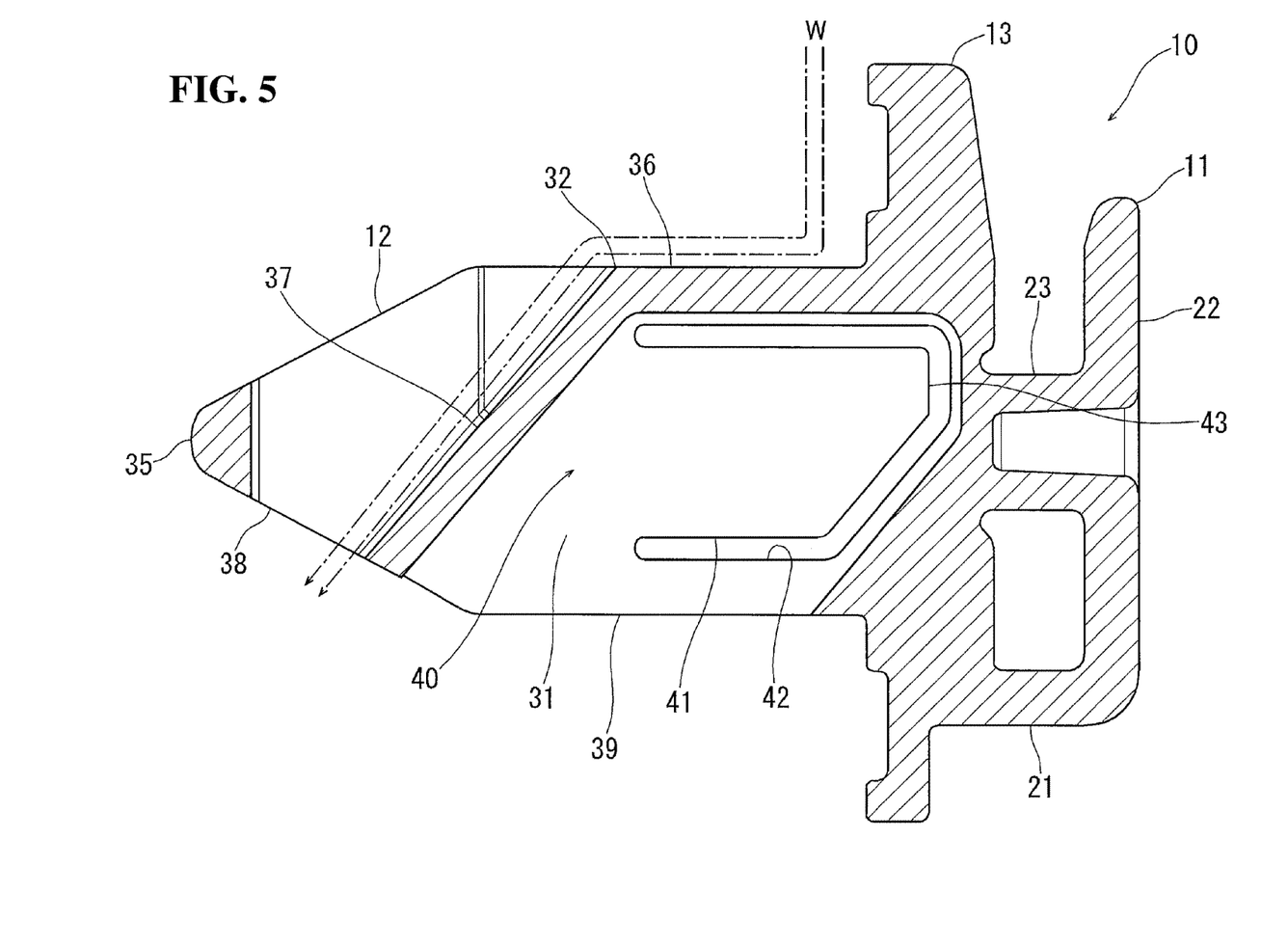
FIG. 5 is a cross-sectional view showing the clip for the door trim.
Figure 6:
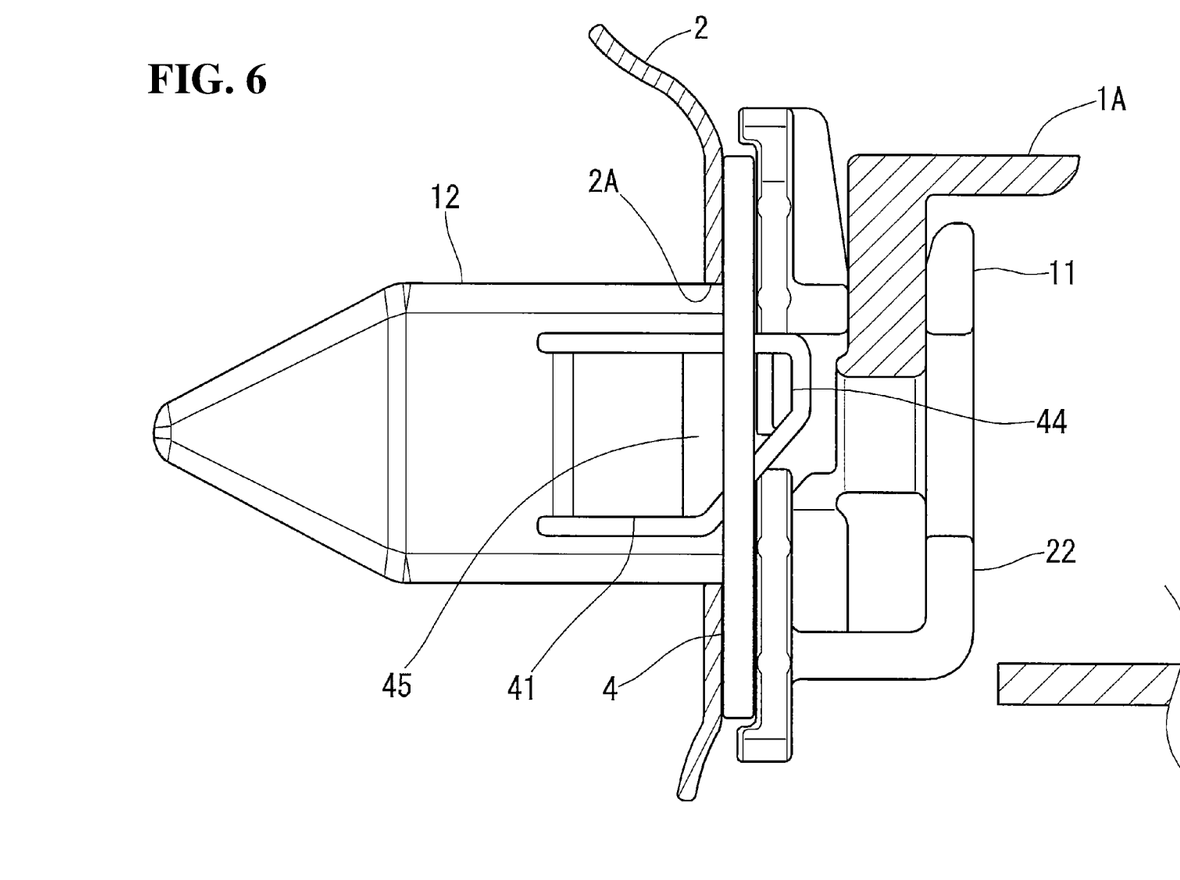
FIG. 6 is a drawing showing a state wherein the clip for the door trim is mounted on the door trim and a door panel.

For details, as shown in FIG. 5, when rainwater W from the vehicle outer side overflows onto the shielding wall 32 of the door-panel placement portion 12, the rainwater W flows into the inclining portion 37 from the horizontal portion 36, and is discharged from the opening portion 38. Namely, the rainwater W is guided in a direction away from the vehicle inner side (door trim 1 side) without retaining on the clip 10, and is discharged toward a front side of the space 40 so as not to enter into the space 40. Therefore, even if the notch portion 14 into which the engagement end portion 43 of the elastic engagement piece 41 enters is formed in the flange portion 13, the rainwater W does not flow into the vehicle inner side so as to adequately prevent the entry of the rainwater W into a vehicle.

Incidentally, in the aforementioned embodiment, the door trim 1, the door panel 2, the door-trim placement portion 11, and the door-panel placement portion 12 respectively correspond to a first member, a second member, a first placement portion and a second placement portion of the invention.

The embodiment of the present invention has been explained in the above, however, the present invention is not limited to the above-mentioned embodiment, and can be appropriately modified within a range described in the invention. For example, in the aforementioned embodiment, the clip 10 for the door trim which mounts the door trim 1 on the door panel 2 has been explained, however, the clip of the present invention is not limited to such an embodiment, and the present invention can be widely applied to a clip for connecting two arbitrary members. Also, in the aforementioned embodiment, one of the plurality of clips for mounting the door trim 1 on the door panel 2 is the clip 10 of the present invention, however, the present invention is not limited to such an embodiment, and can adopt the clip of the present invention for two or more clips among the plurality of clips as well. Also, in the aforementioned embodiment, as for the engagement-piece introduction portion, the notch portion 14 formed in the side portions of the flange portion 13 is used, however, the present invention is not limited to such an embodiment, and the engagement-piece introduction portion may be, for example, a hole provided in the flange portion 13.

The present invention can be used for adequately mounting the door trim on the door panel in the vehicle.

The disclosure of Japanese Patent Application No. 2017-001571, filed on Jan. 10, 2017, is incorporated in the application.

While the invention has been explained with reference to the specific embodiments of the invention, the explanation is illustrative and the invention is limited only by the appended claims.

What is claimed is:

1. A clip for mounting a first member on a second member, comprising:
   a first placement portion adapted to be placed on the first member;
   a second placement portion adapted to be placed in the second member; and
   a flange portion provided between the first placement portion and the second placement portion, and having engagement-piece introduction portions facing the first placement portion,
   wherein the second placement portion includes side walls on two sides, each having a notch, an elastic engagement piece surrounded by the notch, an engagement end portion integrally formed with the elastic engagement piece and located in one of the engagement-piece introduction portions, a shielding wall provided between the side walls and shielding a space between the side walls from an upper side, and an opening between the side walls at the upper side, and
   the shielding wall includes a flat face portion provided on a flange portion side, and an inclining portion provided on a side opposite to the flange portion and inclining downwardly as moving to the side opposite to the flange portion such that the opening is defined at a side opposite to the flat face portion and the space is defined by the flat face portion, the side walls and the inclining portion and communicates with the opening.

2. A clip according to claim 1, wherein an end portion on a side opposite to the flange portion of the second placement portion is closed.

3. A clip according to claim 1, wherein the second placement portion further includes another opening at an end of the inclining portion.

4. A mounting structure of a door trim for mounting the door trim relative to a door panel, comprising:
a clip for the door trim adapted to be inserted and fixed in a horizontal direction relative to the door panel from a vehicle interior side for fixing the door trim,
the clip including a flange portion, and a portion at one side of the flange portion adapted to be fixed and inserted to the door panel and having two side walls, and a shielding wall provided between the two side walls,
wherein each of the side walls includes an elastic engagement piece having an engagement end portion adapted to extend toward the vehicle interior side,
the shielding wall is disposed above the elastic engagement piece, and shields the portion to be inserted to the door panel of the clip from an upper side, and
the shielding wall includes a flat face portion provided on a flange portion side, and an inclining portion provided on a side opposite to the flange portion and inclining downwardly as moving to the side opposite to the flange portion such that an opening is defined at a side opposite to the flat face portion and a space is defined by the flat face portion, the side walls and the inclining portion and communicates with the opening.

5. A mounting structure of a door trim according to claim 4, wherein a portion adapted to be mounted on the door trim in the clip has an L shape in cross section having a horizontal arm portion extending in a horizontal direction and a vertical arm portion extending in a vertical direction from the horizontal arm portion, and the horizontal arm portion is positioned on a lower end side of the vertical arm portion.

6. A mounting structure according to claim 4, wherein the clip further includes another opening at an end of the inclining portion.

\* \* \* \* \*